(12) United States Patent
Trainer et al.

(10) Patent No.: US 9,509,218 B2
(45) Date of Patent: Nov. 29, 2016

(54) DC TO DC CONVERTER ASSEMBLY

(75) Inventors: David Reginald Trainer, Alvaston (GB); Nnamdi Okaeme, London (GB)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 14/236,627

(22) PCT Filed: Aug. 1, 2011

(86) PCT No.: PCT/EP2011/063207
§ 371 (c)(1),
(2), (4) Date: May 5, 2014

(87) PCT Pub. No.: WO2013/017160
PCT Pub. Date: Feb. 7, 2013

(65) Prior Publication Data
US 2014/0293656 A1 Oct. 2, 2014

(51) Int. Cl.
*H02M 3/335* (2006.01)
*H02M 7/483* (2007.01)
*H02M 3/28* (2006.01)

(52) U.S. Cl.
CPC .............. *H02M 3/28* (2013.01); *H02M 3/335* (2013.01); *H02M 3/33576* (2013.01); *H02M 7/483* (2013.01); *H02M 2007/4835* (2013.01)

(58) Field of Classification Search
CPC ............ H02J 3/36; H02M 7/42; H02M 7/44; H02M 7/48; H02M 7/483; H02M 7/49; H02M 7/5387; H02M 7/7575; H02M 7/797; H02M 2007/4835
USPC ................ 363/15–17, 34, 35, 37–43, 50–55, 363/56.01–56.05, 57–58, 84–89, 95–98, 363/123, 125, 131–132, 135–138
See application file for complete search history.

(56) References Cited

U.S. PATENT DOCUMENTS 3,857,083 A 12/1974 Lundstrom
3,867,643 A 2/1975 Baker et al.
(Continued)

FOREIGN PATENT DOCUMENTS

CN 101 795 072 A 8/2010
DE 43 17 965 12/1994
(Continued)

OTHER PUBLICATIONS

Office Action in U.S. Appl. No. 13/388,277, mailed on Mar. 18, 2015.
(Continued)

*Primary Examiner* — Timothy J Dole
*Assistant Examiner* — Ivan Laboy Andino
(74) *Attorney, Agent, or Firm* — Nixon Peabody LLP; Khaled Shami

(57) ABSTRACT

A DC to DC converter assembly, for connecting first and second high voltage DC power transmission networks, comprising first and second modular multilevel converters, each converter including a first converter limb having first and second limb portions, each limb portion including a least one module switchable to selectively provide a voltage source and thereby vary the magnitude ratio of a DC voltage (V1, V2) across the first and second terminals of a respective converter and an AC voltage (VAC) at the third terminal of the corresponding converter, the DC to DC converter assembly further including a first link electrically connecting the third terminal of one converter, with the third terminal of the other converter, and at least one converter further including a controller configured to switch the first and second limb portions in the first converter limb of the said converter into simultaneous conduction to divert a portion (IDiV1) of current flowing within the said converter away from the first link.

14 Claims, 5 Drawing Sheets

(56) References Cited

U.S. PATENT DOCUMENTS

| | | | |
|---|---|---|---|
| 4,053,820 A | 10/1977 | Peterson et al. | |
| 4,300,181 A | 11/1981 | Premerlani | |
| 4,636,907 A | 1/1987 | Howell | |
| 4,658,227 A | 4/1987 | Howell et al. | |
| 4,663,702 A | 5/1987 | Tanaka | |
| 4,816,736 A | 3/1989 | Dougherty et al. | |
| 5,027,264 A * | 6/1991 | DeDoncker et al. | 363/16 |
| 5,093,583 A | 3/1992 | Mashino et al. | |
| 5,164,872 A | 11/1992 | Howell | |
| 5,339,210 A | 8/1994 | Howell | |
| 5,345,375 A | 9/1994 | Mohan | |
| 5,499,178 A | 3/1996 | Mohan | |
| 5,515,264 A | 5/1996 | Stacey | |
| 5,532,575 A | 7/1996 | Ainsworth et al. | |
| 5,561,595 A | 10/1996 | Smith | |
| 5,644,482 A | 7/1997 | Asplund | |
| 5,673,189 A | 9/1997 | Schettler | |
| 5,719,486 A | 2/1998 | Taniguchi et al. | |
| 5,726,557 A | 3/1998 | Umeda et al. | |
| 5,870,293 A | 2/1999 | Svensson et al. | |
| 5,889,667 A | 3/1999 | Bernet | |
| 5,892,677 A | 4/1999 | Chang | |
| 5,936,855 A | 8/1999 | Salmon | |
| 5,999,422 A | 12/1999 | Goransson et al. | |
| 6,134,126 A | 10/2000 | Ikekame et al. | |
| 6,137,704 A | 10/2000 | Ito et al. | |
| 6,236,580 B1 | 5/2001 | Aiello et al. | |
| 6,301,130 B1 | 10/2001 | Aiello et al. | |
| 6,320,767 B1 | 11/2001 | Shimoura et al. | |
| 6,392,348 B1 | 5/2002 | Dougherty | |
| 6,603,675 B1 | 8/2003 | Norrga | |
| 6,879,062 B2 | 4/2005 | Oates | |
| 6,987,680 B2 | 1/2006 | Vire et al. | |
| 7,050,311 B2 | 5/2006 | Lai et al. | |
| 7,170,767 B2 | 1/2007 | Bixel | |
| 7,199,535 B2 | 4/2007 | Welchko et al. | |
| 7,274,576 B1 | 9/2007 | Zargari et al. | |
| 7,292,462 B2 | 11/2007 | Watanabe et al. | |
| 7,298,115 B2 | 11/2007 | Nishimura et al. | |
| 7,499,291 B2 | 3/2009 | Han | |
| 7,622,825 B2 | 11/2009 | Brune et al. | |
| 7,729,144 B2 | 6/2010 | Urakabe et al. | |
| 8,188,720 B2 | 5/2012 | Kim et al. | |
| 8,294,408 B2 | 10/2012 | Matt et al. | |
| 8,390,259 B2 | 3/2013 | Dommaschk et al. | |
| 8,599,591 B2 | 12/2013 | Crookes et al. | |
| 8,848,401 B2 | 9/2014 | Green et al. | |
| 8,854,843 B2 | 10/2014 | Trainer et al. | |
| 8,861,231 B2 | 10/2014 | Cross et al. | |
| 8,861,234 B2 | 10/2014 | Trainer et al. | |
| 8,867,242 B2 | 10/2014 | Clare et al. | |
| 8,867,244 B2 | 10/2014 | Trainer et al. | |
| 8,891,209 B2 | 11/2014 | Hafner et al. | |
| 8,934,268 B2 | 1/2015 | Trainer et al. | |
| 9,065,299 B2 | 6/2015 | Trainer et al. | |
| 2002/0060497 A1 | 5/2002 | Arita et al. | |
| 2002/0149953 A1 | 10/2002 | Smedley et al. | |
| 2002/0176265 A1 | 11/2002 | Oates | |
| 2003/0202367 A1 | 10/2003 | Schreiber | |
| 2004/0218318 A1 | 11/2004 | Bijlenga et al. | |
| 2005/0127853 A1 | 6/2005 | Su | |
| 2005/0135126 A1 | 6/2005 | Gazel et al. | |
| 2005/0146226 A1 | 7/2005 | Trainer et al. | |
| 2008/0002443 A1 | 1/2008 | Ueda et al. | |
| 2008/0007978 A1 | 1/2008 | Han | |
| 2008/0137383 A1 | 6/2008 | Chang et al. | |
| 2008/0179951 A1 | 7/2008 | Brune et al. | |
| 2008/0205093 A1 | 8/2008 | Davies et al. | |
| 2008/0258661 A1 | 10/2008 | Nagashima et al. | |
| 2008/0309301 A1* | 12/2008 | Shimada | H02M 3/158 323/282 |
| 2008/0310205 A1 | 12/2008 | Hiller | |
| 2009/0021966 A1 | 1/2009 | Jacobson et al. | |
| 2009/0027934 A1 | 1/2009 | Robledo Bustos | |
| 2009/0033254 A1 | 2/2009 | Nagashima et al. | |
| 2009/0085548 A1 | 4/2009 | Suh et al. | |
| 2009/0102436 A1 | 4/2009 | Escobar Valderrama et al. | |
| 2009/0116268 A1 | 5/2009 | Kishida et al. | |
| 2009/0206781 A1 | 8/2009 | Itoh et al. | |
| 2010/0067266 A1 | 3/2010 | Dommaschk et al. | |
| 2010/0118578 A1 | 5/2010 | Dommaschk et al. | |
| 2010/0309698 A1 | 12/2010 | Asplund et al. | |
| 2011/0018481 A1 | 1/2011 | Hiller | |
| 2011/0044077 A1 | 2/2011 | Nielsen | |
| 2011/0149622 A1 | 6/2011 | Lin | |
| 2011/0205768 A1 | 8/2011 | Svensson | |
| 2011/0260701 A1 | 10/2011 | Horger et al. | |
| 2011/0280049 A1 | 11/2011 | Mori et al. | |
| 2012/0026767 A1 | 2/2012 | Inoue et al. | |
| 2012/0063185 A1 | 3/2012 | Janning | |
| 2012/0069610 A1 | 3/2012 | Trainer et al. | |
| 2012/0120697 A1 | 5/2012 | Cuk | |
| 2012/0127766 A1 | 5/2012 | Crookes et al. | |
| 2012/0170338 A1 | 7/2012 | Trainer et al. | |
| 2012/0182771 A1 | 7/2012 | Trainer et al. | |
| 2012/0188803 A1 | 7/2012 | Trainer et al. | |
| 2012/0195084 A1 | 8/2012 | Norrga | |
| 2012/0234796 A1 | 9/2012 | Juhlin | |
| 2013/0020881 A1 | 1/2013 | Panousis et al. | |
| 2013/0026841 A1* | 1/2013 | Hosini | H02J 3/1842 307/77 |
| 2013/0051105 A1 | 2/2013 | Wang et al. | |
| 2013/0094264 A1 | 4/2013 | Crookes et al. | |
| 2013/0099572 A1 | 4/2013 | Norrga | |
| 2013/0119970 A1 | 5/2013 | Trainer et al. | |
| 2013/0128629 A1 | 5/2013 | Clare et al. | |
| 2013/0128636 A1 | 5/2013 | Trainer et al. | |
| 2013/0182467 A1 | 7/2013 | Cross et al. | |
| 2013/0194838 A1 | 8/2013 | Jang et al. | |
| 2013/0208514 A1 | 8/2013 | Trainer et al. | |
| 2013/0208521 A1 | 8/2013 | Trainer et al. | |
| 2013/0279211 A1 | 10/2013 | Green et al. | |
| 2014/0098575 A1 | 4/2014 | Whitehouse | |
| 2014/0133196 A1 | 5/2014 | Trainer | |
| 2014/0146583 A1 | 5/2014 | Trainer et al. | |
| 2014/0254205 A1* | 9/2014 | Trainer et al. | 363/17 |
| 2014/0293656 A1 | 10/2014 | Trainer et al. | |
| 2014/0293668 A1 | 10/2014 | Trainer | |
| 2014/0313797 A1 | 10/2014 | Davidson et al. | |
| 2015/0009594 A1 | 1/2015 | Okaeme et al. | |
| 2015/0116881 A1 | 4/2015 | Burnett et al. | |
| 2015/0131189 A1 | 5/2015 | Davidson et al. | |

FOREIGN PATENT DOCUMENTS

| | | |
|---|---|---|
| DE | 195 35 552 | 4/1996 |
| DE | 101 03 031 | 7/2002 |
| DE | 10 2005 040 432 | 3/2007 |
| DE | 10 2007 003172 | 2/2008 |
| DE | 10 2008 045247 | 3/2008 |
| DE | 10 2008 014 898 | 9/2009 |
| DE | 10 2010 007 452 | 8/2011 |
| EP | 0 867 998 B1 | 3/2007 |
| EP | 1 800 391 A2 | 6/2007 |
| GB | 2 294 821 A | 5/1996 |
| GB | 2 375 902 A | 11/2002 |
| GB | 2 418 079 A | 3/2006 |
| JP | 2008-125310 A | 5/2008 |
| WO | WO 97/02639 | 1/1997 |
| WO | WO 02/50972 | 6/2002 |
| WO | WO 02/063758 | 8/2002 |
| WO | WO 03/055048 | 7/2003 |
| WO | 2007/033852 | 3/2007 |
| WO | WO 2007/023061 A2 | 3/2007 |
| WO | WO 2007/028349 | 3/2007 |
| WO | WO 2007/028350 | 3/2007 |
| WO | WO 2008/024038 | 2/2008 |
| WO | WO 2008/086760 | 7/2008 |
| WO | WO 2009/149743 | 12/2009 |
| WO | WO 2010/025758 | 3/2010 |
| WO | WO 2010/040388 | 4/2010 |
| WO | WO 2010/069371 | 6/2010 |
| WO | WO 2010/088969 | 8/2010 |
| WO | WO 2010/112523 | 10/2010 |

(56) References Cited

FOREIGN PATENT DOCUMENTS

| | | | | |
|---|---|---|---|---|
| WO | WO 2010/145688 | 12/2010 | | |
| WO | WO 2010/145689 | 12/2010 | | |
| WO | WO 2010/145690 | 12/2010 | | |
| WO | WO 2010/149200 | 12/2010 | | |
| WO | WO 2010145692 A1 | * 12/2010 | ........... | G01R 31/282 |
| WO | WO 2011/012171 | 2/2011 | | |
| WO | WO 2011/012174 | 2/2011 | | |
| WO | WO 2011/015227 | 2/2011 | | |
| WO | WO 2011/029480 | 3/2011 | | |
| WO | WO 2011/044928 | 4/2011 | | |
| WO | 2011050832 A1 | 5/2011 | | |
| WO | WO 2011/050847 | 5/2011 | | |
| WO | WO 2011/098117 | 8/2011 | | |
| WO | WO 2011/113471 | 9/2011 | | |
| WO | WO 2011/124258 | 10/2011 | | |
| WO | WO 2011/127980 | 10/2011 | | |
| WO | WO 2011/141054 | 11/2011 | | |
| WO | WO 2011/157300 | 12/2011 | | |
| WO | WO 2012007040 A1 | * 1/2012 | ........... | H02M 3/335 |
| WO | WO 2012/013248 | 2/2012 | | |
| WO | WO 2012/025142 | 3/2012 | | |
| WO | WO 2012/167826 | 12/2012 | | |
| WO | WO 2013/000510 | 1/2013 | | |
| WO | WO 2013/071975 | 5/2013 | | |
| WO | WO 2013/017160 | 7/2013 | | |
| WO | WO 2013/017177 | 7/2013 | | |
| WO | WO 2013/127461 | 9/2013 | | |
| WO | WO 2013/127462 | 9/2013 | | |
| WO | WO 2013/127463 | 9/2013 | | |

OTHER PUBLICATIONS

Notice of Allowance in U.S. Appl. No. 13/634,205, mailed on Apr. 27, 2015.
Office Action in U.S. Appl. No. 14/129,923, mailed on Feb. 17, 2015.
Office Action in U.S. Appl. No. 14/359,088, mailed on Apr. 7, 2015.
Allebrod, S. et al., "New Transformerless, Scalable Modular Multilevel Converters for HVDC—Transmission", Power Electronics Specialists Conference, IEEE, Jun. 15, 2008, pp. 174-179.
Baran, M. E. et al., "Overcurrent Protection in DC Zonal Shipboard Power Systems using Solid State Protection Devices", Electric Ship Technologies Symposium, 2007, ESTS '07, IEEE, PI, May 1, 2007, pp. 221-224.
Ertl, H et al., "A Constant Output Current Three-Phase Diode Bridge Rectifier Employing a Novel Electronic Smoothing Inductor", IEEE Transactions on Industrial Electronics,vol. 52, Issue 2, Apr. 1, 2005, pp. 454-461.
Glinka, M., "Prototype of Multiphase Modular-Multilevel-Converter with 2MW Power Rating and 17-Level-Output-Voltage", 2004 35th Annual IEEE Power Electronics Specialists Conference, Jun. 20-25, 2004, pp. 2572-2576.
Guanjun Ding, et al., "New Technologies of Voltage Source Converter (VSC) for HVDC Transmission System Based on VSC", Power and Energy Society General Meeting—Conversion and Delivery of Electrical Energy in the 21st Century, 2008 IEEE, Piscataway, NJ, USA, Jul. 20, 2008, pp. 1-8.
Hagiwara, Makoto et al., "PWM Control and Experiment of Modular Multilevel Converters", Power Electronics Specialists Conference (PESC), Rhodes, Jun. 15-19, 2008, IEEE, pp. 154-161.
Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.
Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.
Lesnicar, A. et al., "A New Modular Voltage Source Inverter Topology", European Power Electronics Conference (EPE), Toulouse, France, Sep. 2-4, 2003, 10 pages.

Lesnicar, A. et al., "An Innovative Modular Multilevel Converter Topology Suitable for a Wide Power Range", Power Tech Conference Proceedings, Bologna, Italy, Jun. 23-26, 2003, Bologna, IEEE, vol. 3, 2003, 6 pages.
Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.
Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.
Merlin, M.M.C. et al. "A New Hybrid Multi-Level Voltage-Source Converter With DC Fault Blocking Capability", 9th IET International Conference on AC and DC Power Transmission, ACDC 2010, Oct. 19-21, 2010, 5 pages.
Qahraman, B. et al., "A VSC Based Series Hybrid Converter for HVDC Transmission", Canadian Conference Electrical and Computer Engineering Conference, 2005, CCECE/CCGEI, Saskatoon, May 1-4, 2005, pp. 458-461.
Raju, N.R., "A DC Link-Modulated Three-Phase Converter", Industry Applications Conference, 2001. Thirty-Sixth IAS Annual Meeting, Chicago, IL, Sep. 30, 2001-Oct. 4, 2001. Conference Record of the 2001 IEEE, vol. 4, pp. 2181-2185.
Su, Gui-Jia et al., "Multilevel DC Link Inverter for Brushless Permanent Magnet Motors with Very Low Inductance", Industry Applications Conference, 2001. Thirty-Sixth IAS Annual Meeting, Chicago, IL, Sep. 30, 2001-Oct. 4, 2001. Conference Record of the 2001 IEEE , vol. 2, pp. 829-834.
Watkins, S.J. et al., "Multilevel Asymmetric Power Converters for Switched Reluctance Machines", International Conference on Power Electronics, Machines and Drives, Apr. 16-18, 2002, IEEE 2002, Conf. Publ. No. 487, pp. 195-200.
Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.
Zhang, W. et al., "Active DC Filter for HVDC Systems", IEEE Computer Applications in Power, vol. 7, No. 1, Jan. 1994, New York, USA, pp. 40-44.
PCT International Search Report and Written Opinion for Application No. PCT/EP2009/057388, mailed on Mar. 18, 2010.
PCT International Preliminary Report on Patentability in International Application No. PCT/EP2009/057388, mailed on Dec. 14, 2011.
PCT International Search Report and Written Opinion in International Application No. PCT/EP2009/057736, mailed on Mar. 26, 2010.
PCT International Preliminary Report on Patentability in International Application No. PCT/EP2009/057736, mailed on Nov. 24, 2011.
PCT International Search Report and Written Opinion in International Application No. PCT/EP2009/059973, mailed on Aug. 13, 2010.
PCT International Preliminary Report on Patentability in International Application No. PCT/EP2009/059973, mailed on Oct. 5, 2011.
PCT International Search Report and Written Opinion in International Application No. PCT/EP2010/051572, mailed on Jan. 19, 2011.
PCT International Preliminary Report on Patentability in International Application No. PCT/EP2010/051572, mailed on Apr. 20, 2012.
PCT International Search Report and Written Opinion in International Application No. PCT/EP2010/053290, mailed on Feb. 11, 2011.
PCT International Preliminary Report on Patentability in International Application No. PCT/EP2010/053290, mailed on Apr. 20, 2012.
PCT International Search Report and Written Opinion in International Application No. PCT/EP2010/054660, mailed on Feb. 24, 2011.

(56) References Cited

OTHER PUBLICATIONS

PCT International Preliminary Report on Patentability in International Application No. PCT/EP2010/054660, mailed on Jun. 6, 2012.
PCT International Search Report for International Application No. PCT/EP2010/054974, mailed on Mar. 4, 2011.
PCT International Preliminary Report on Patentability in International Application No. PCT/EP2010/054974, mailed on Aug. 10, 2012.
PCT International Search Report and Written Opinion in International Application No. PCT/EP2010/058630, mailed on Apr. 19, 2011.
PCT International Preliminary Report on Patentability in International Application No. PCT/EP2010/058630, mailed on Dec. 19, 2012.
PCT International Search Report in International Application No. PCT/EP2010/061145, mailed on Jun. 5, 2011.
PCT International Preliminary Report on Patentability in International Application No. PCT/EP2010/061145, mailed on Aug. 20, 2012.
PCT International Search Report and Written Opinion in International Application No. PCT/EP10/62316, mailed on Jul. 6, 2011.
PCT International Preliminary Report on Patentability in International Application No. PCT/EP10/62316, mailed on Mar. 7, 2013.
PCT International Search Report and Written Opinion in International Application No. PCT/EP2011/059514, mailed on Jul. 5, 2012.
PCT International Preliminary Report on Patentability in International Application No. PCT/EP2011/059514, mailed on Aug. 1, 2013.
PCT International Search Report and Written Opinion in International Application No. PCT/EP2011/060907, mailed on Jul. 16, 2012.
PCT International Preliminary Report on Patentability in International Application No. PCT/EP2011/060907, mailed on Sep. 24, 2013.
PCT International Search Report and Written Opinion in International Application No. PCT/EP2011/064545, mailed Jun. 11, 2012.
PCT International Preliminary Report on Patentability in International Application No. PCT/EP2011/064545, mailed May 19, 2014.
PCT International Search Report and Written Opinion in International Application No. PCT/EP2011/070402, mailed on Sep. 27, 2012.
PCT International Preliminary Report on Patentability in International Application No. PCT/EP2011/070402, mailed on Feb. 18, 2014.
PCT International Search Report and Written Opinion in International Application No. PCT/EP2012/053571, mailed on Jun. 20, 2012.
PCT International Preliminary Report on Patentability in International Application No. PCT/EP2012/053571, mailed on Sep. 12, 2014.
PCT International Search Report and Written Opinion in International Application No. PCT/EP2012/053574, mailed on Nov. 20, 2012.
PCT International Preliminary Report on Patentability in International Application No. PCT/EP2012/053574, mailed on Jul. 21, 2014.
PCT International Search Report and Written Opinion in International Application No. PCT/EP2012/053573, mailed on Dec. 4, 2012.
PCT International Preliminary Report on Patentability in International Application No. PCT/EP2012/053573, mailed on Jul. 21, 2014.
First Chinese Office Action in Application No. 200980160700.4, mailed Jun. 25, 2014.
Notice of Allowance in U.S. Appl. No. 13/378,336, mailed on Feb. 6, 2014.
Notice of Allowance in U.S. Appl. No. 13/378,336, mailed on Jun. 13, 2014.
Notice of Allowance in U.S. Appl. No. 13/380,500, mailed on Jun. 11, 2013.
Notice of Allowance in U.S. Appl. No. 13/380,500, mailed on Jul. 31, 2013.
Office Action in U.S. Appl. No. 13/388,277, mailed on Nov. 22, 2013.
Office Action in U.S. Appl. No. 13/388,277, mailed on Jul. 3, 2014.
Notice of Allowance in U.S. Appl. No. 13/576,920, mailed on Dec. 4, 2013.
Notice of Allowance in U.S. Appl. No. 13/576,920, mailed on Mar. 20, 2014.
Notice of Allowance in U.S. Appl. No. 13/576,920, mailed on Jun. 9, 2014.
Office Action in U.S. Appl. No. 13/634,205, mailed on Sep. 22, 2014.
Office Action in U.S. Appl. No. 13/639,844, mailed on May 22, 2014.
Notice of Allowance in U.S. Appl. No. 13/639,844, mailed on Sep. 8, 2014.
Notice of Allowance in U.S. Appl. No. 13/640,468, mailed on Jun. 4, 2014.
Notice of Allowance in U.S. Appl. No. 13/805,333, mailed on Feb. 2, 2015.
Notice of Allowance in U.S. Appl. No. 13/813,414, mailed on Jun. 2, 2014.
Notice of Allowance in U.S. Appl. No. 13/818,654, mailed on May 30, 2014.
U.S. Appl. No. 14/379,746, filed Aug. 28, 2014.
U.S. Appl. No. 14/381,570, filed Aug. 27, 2014.
U.S. Appl. No. 14/357,908, filed May 13, 2014.
Davidson, C.C et al., "Innovative Concepts for Hybrid Multi-Level Converters for HVDC Power Transmission", 9th IET International Conference on AC and DC Power Transmission, ACDC 2010, 5 pages, Oct. 19-21, 2010.
Flourentzou, Nikolas et al., "VSC-Based HVDC Power Transmission Systems: An Overview", IEEE Transactions on Power Electronics, vol. 24, No. 3, pp. 592-602, Mar. 2009.
International Search Report and Written Opinion in International Application No. PCT/EP2011/063207, mailed May 30, 2012.
International Preliminary Report on Patentability in International Application No. PCT/EP2011/063207, mailed Apr. 2, 2014.
Notice of Allowance for U.S. Appl. No. 14/356,882, mailed Jul. 20, 2015.
Office Action, dated Aug. 28, 2015, issued in U.S. Appl. No. 14/124,704.
Examiner-Initiated Interview Summary, dated Jan. 5, 2016, issued in U.S. Appl. No. 14/359,088, 3 pages.
Office Action, dated Mar. 16, 2016, issued in U.S Appl. No. 14/381,570, 32 pages.
Office Action, dated Mar. 23, 2016, issued in U.S Appl. No. 14/379,746, 31 pages.
Office Action, dated Sep. 1, 2015, issued in U.S. Appl. No. 14/377,824.
Final Office Action, dated Sep. 18, 2015, issued in U.S. Appl. No. 14/129,923.
Office Action, dated Oct. 7, 2015, issued in U.S. Appl. No. 13/388,277.

* cited by examiner

DC TO DC CONVERTER ASSEMBLY

CROSS REFERENCE TO RELATED APPLICATIONS

This application is the national stage of International Application No. PCT/EP2011/063207, filed Aug. 1, 2011, entitled, "A DC to DC Converter Assembly," the contents of which are incorporated herein by reference in their entirety.

BACKGROUND

Field of the Invention

This invention relates to a DC to DC converter assembly, and in particular a DC to DC converter assembly for connecting first and second high voltage DC power transmission networks.

Description of Related Art

With the increasing prevalence of renewable energy generators, such as off-shore wind, there is a growing need to transmit direct current (DC) electrical power from one high voltage DC power transmission network to another high voltage DC power transmission network.

At present the only manner in which such transmission between high voltage DC networks can be achieved is through the provision of first and second conventional voltage converters 10, 12 which are interconnected by a high power transformer 14, as shown in FIG. 1. The first voltage converter 10 converts an incoming DC voltage from a first voltage DC network 16 into an alternating voltage which the transformer 14 increases or decreases to allow conversion by the second voltage converter 12 to a desired outgoing DC voltage, as required in a second voltage DC network 18.

High power transformers typically operate at 50 or 60 Hz while the size and weight of the components forming the first and second voltage converters 10, 12 and the power transformers themselves can be dramatically reduced by operating the converters 10,12 at a much higher frequency, typically in the region of 500 Hz. As a result the aforementioned scheme operating at 50 or 60 Hz requires a very large and heavy transformer and other passive energy storage elements which are often unsuitable for installation in a required location.

In addition, high power high frequency (i.e. circa 500 Hz) transformers are costly, bespoke components which are not currently available on a commercial scale.

There is, therefore, a need for an improved means of connecting first and second high voltage DC power transmission networks which obviates the need for a large, heavy and costly high power transformer.

SUMMARY

According to an aspect of the invention there is provided a DC to DC converter assembly, for connecting first and second high voltage DC power transmission networks, comprising first and second modular multilevel converters, each converter including first and second terminals connectable in use to a respective first or second high voltage DC power transmission network, and each converter also including a first converter limb extending between the first and second terminals and having first and second limb portions separated by a third terminal, each limb portion including a least one module switchable to selectively provide a voltage source and thereby vary the magnitude ratio of a DC voltage across the first and second terminals of a respective converter and an AC voltage at the third terminal of the corresponding converter, the DC to DC converter assembly further including a first link electrically connecting the third terminal of one converter with the third terminal of the other converter, and at least one converter further including a controller configured to switch the first and second limb portions in the first converter limb of the said converter into simultaneous conduction to divert a portion of current flowing within the said converter away from the first link.

The provision of such modules in each limb portion allows one modular multilevel converter to synthesise an alternating voltage from an incoming DC voltage presented across the first and second terminals of the said modular multilevel converter. Such a converter can thereby control the magnitude ratio of the alternating and DC voltages.

The first link is then able to conduct the alternating voltage to the other modular multilevel converter which utilises the modules therein to synthesise an outgoing DC voltage across the first and second terminals of the other modular multilevel converter. The other modular multilevel converter is thereby able to control the magnitude ratio of the alternating voltage from the first link and the outgoing DC voltage.

Hence the converter assembly is able to vary the ratio of the incoming DC voltage and the outgoing DC voltage so as to accommodate differing DC voltage levels in first and second high voltage DC power transmission networks.

The further ability to divert a portion of current flowing within the said converter away from the first link, by switching the first and second limb portions in the first converter limb of the said converter into simultaneous conduction, means that it is possible also to vary the magnitude of current flowing through the first link, and hence the magnitude of current flowing from one converter to the other.

The combined ability to vary the magnitude of both the current and the voltage transmitted by the first link from one converter to the other converter allows the converter assembly of the invention to maintain a power balance between the first and second converters, and so avoids the need to include a high power transformer between the first and second converters. Such a converter assembly is, therefore, smaller, lighter and less expensive than the conventional DC to DC connection scheme mentioned hereinabove.

Preferably the first link includes a series inductance.

The inclusion of a series inductance in the first link allows the first and second converters to selectively generate or absorb reactive power, and so permits the converter assembly of the invention to accommodate differing magnitudes of alternating voltage at either end of the first link. Such functionality increases the maximum ratio of incoming and outgoing DC voltages that the converter assembly is able to handle.

Optionally each converter includes a second converter limb extending between the first and second terminals and having third and fourth limb portions separated by a fourth terminal, the fourth terminals of the converters being connected to one another by a second link.

Such an arrangement increases the flexibility with which the converter assembly is able to transfer voltage and current from one converter to another via the said first and second links.

Each of the third and fourth limb portions in at least one converter may include at least one module switchable to selectively provide a voltage source, and the controller may be further configured to switch the third and fourth limb portions in the second converter limb of the at least one converter into simultaneous conduction to divert a portion of current flowing within the said converter away from the second link.

The inclusion of such modules in the third and fourth limb portions in at least one converter provides for a wide range of differing ratios between the incoming DC voltage and the outgoing DC voltage, and permits the transfer of power from one converter to the other in both directions.

Preferably the second link includes a series inductance. Such an element permits the first and second converters to selectively generate or absorb reactive power within a second phase of alternating voltage transmitted between the convertors, and so provides improved flexibility in terms of permissible alternating voltage magnitudes at either end of the second link.

Each of the third and fourth limb portions in a converter may include a passive voltage storage element. The inclusion of such elements simplifies the component structure in the said third and fourth limb portions while the converter assembly maintains a desired degree of functionality.

In a preferred embodiment of the invention each converter includes a third converter limb extending between the first and second terminals and having fifth and sixth limb portions separated by a fifth terminal, the fifth terminals of the converters being connected to one another by a third link.

Such an arrangement further increases the flexibility with which the converter assembly is able to transfer voltage and current from one converter to another via first, second and third links.

Optionally each of the fifth and sixth limb portions in at least one converter include at least one module switchable to selectively provide a voltage source, and the controller is further configured to switch the fifth and sixth limb portions in the third converter limb of the at least one converter into simultaneous conduction to divert a portion of current flowing within the said converter away from the third link.

Including at least one module in each of the fifth and sixth limb portions of at least one converter provides for a wide range of differing ratios between the incoming DC voltage and the outgoing DC voltage, while permitting the transfer of power from one converter to the other in both directions.

In a further preferred embodiment of the invention the third link includes a series inductance.

This permits the first and second converters to selectively generate or absorb reactive power, and so provides improved flexibility in terms of differing alternating voltage magnitudes at either end of the third link that the converter assembly is able to accommodate. Hence the range of possible ratios between the incoming DC voltage and the outgoing DC voltage is increased.

Each of the fifth and sixth limb portions in one converter may include a passive voltage storage element. The inclusion of such elements simplifies the component structure in the said fifth and sixth limb portions while the converter assembly maintains a desired degree of functionality.

In another preferred embodiment of the invention each module includes at least one set of series-connected switching elements connected in parallel with at least one energy storage device.

The foregoing features provide flexibility in configuring each of the first and second converters according to the requirements of the associated power transmission application.

Preferably at least one module includes a set of series-connected switching elements connected in parallel with the respective energy storage device in a half-bridge arrangement to define a 2-quadrant unipolar module that can provide zero or positive voltage and can conduct current in two directions.

Such an arrangement allows the at least one module to contribute to a voltage magnitude decrease across the converter in which it is located.

Optionally at least one module includes two sets of series-connected switching elements connected in parallel with the respective energy storage device in a full-bridge arrangement to define a 4-quadrant bipolar module that can provide zero, positive or negative voltage and can conduct current in two directions.

Such an arrangement allows the at least one module to contribute to either a voltage magnitude increase or a voltage magnitude decrease across the converter in which it is located.

In a still further preferred embodiment of the invention the or at least one switching element of each module further includes an anti-parallel diode connected in parallel therewith.

Preferably the or each anti-parallel diode is configured to inhibit the flow of current through the modular multilevel converter in which it is located from the high voltage DC power transmission network which the converter is in use connected with to the high voltage DC power transmission network in which a fault has occurred.

The inclusion of such anti-parallel diodes allows the converter assembly of the invention to handle a fault in one of the first or second high voltage DC power transmission networks and prevent its propagation to the other network. This is highly desirable because it allows the connection of two existing high voltage DC power networks without the need to increase the fault level in either network. As such, existing cables, transmission lines, and protection equipment can continue to be used without the need to upgrade their capability to accommodate an increased fault current that might otherwise flow from the newly connected network.

BRIEF DESCRIPTION OF THE DRAWINGS

There now follows a brief description of preferred embodiments of the invention, by way of non-limiting examples, with reference to the accompanying drawings in which.

DETAILED DESCRIPTION

Figure 1:
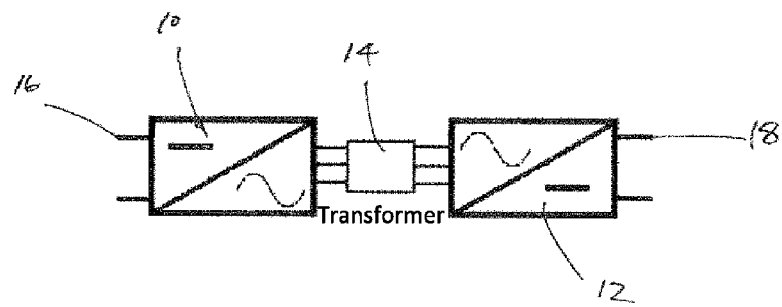
FIG. 1 shows a conventional DC to DC connection scheme.
Figure 2:
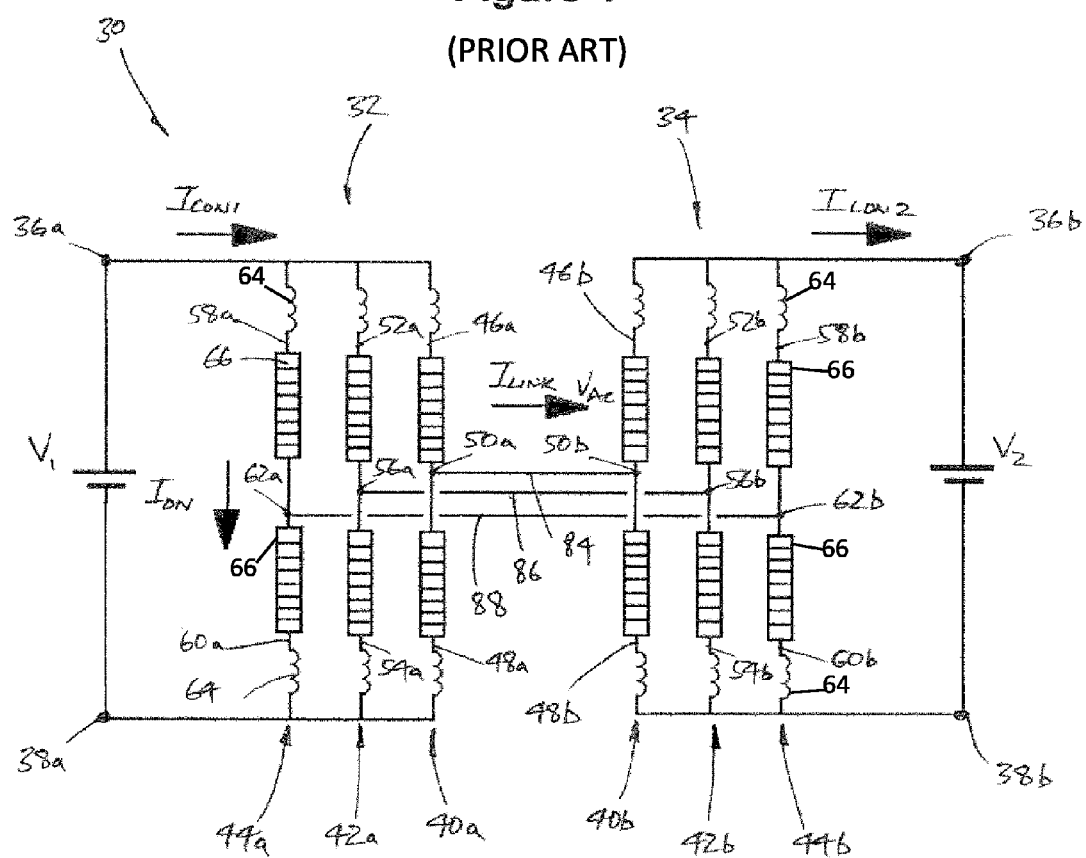
FIG. 2 shows a DC to DC converter assembly according to a first embodiment of the invention.

A DC to DC converter assembly according to a first embodiment of the invention is designated generally by the reference numeral 30, as shown in FIG. 2.

The converter assembly 30 includes first and second modular multilevel converters 32, 34.

The first modular multilevel converter 32 has first and second terminals 36a, 38a which, in use, are connected to a first high voltage DC power transmission network 16. The second modular multilevel converter 34 includes similar first and second terminals 36b, 38b which, in use, are connected to a second high voltage DC power transmission network 18. In the embodiment shown the second network 18 operates at a higher voltage than the first network 16.

The first converter 32 also includes first, second and third converter limbs 40a, 42a, 44a which extend between the first and second terminals 36a, 38a thereof. Each converter limb 40a, 42a, 44a includes respective limb portions which are separated by a terminal.

In particular, a first converter limb 40a includes first and second limb portions 46a, 48a which are separated by a third terminal 50a; a second converter limb 42a includes third and fourth limb portions 52a, 54a that are separated by a fourth terminal 56a; and a third converter limb 44a includes fifth and sixth limb portions 58a, 60a which are separated by a fifth terminal 62a.

In the embodiment shown each limb portion 46a, 48a, 52a, 54a, 58a, 60a includes an inductor 64 and eight modules 66 which are described in more detail hereinbelow. Other embodiments of the invention may include greater than or fewer than eight modules 66 in each limb portion 46a, 48a, 52a, 54a, 58a, 60a.

The second modular multilevel converter 34 includes an essentially identical arrangement of first, second and third converter limbs 40b, 42b, 44b which extend between the first and second terminals 36b, 38b thereof, i.e. a first converter limb 40b that includes first and second limb portions 46b, 48b which are separated by a third terminal 50b; a second converter limb 42b including third and fourth limb portions 52b, 54b that are separated by a fourth terminal 56b; and a third converter limb 44b that includes fifth and sixth limb portions 58b, 60b which are separated by a fifth terminal 62b.

Each of the limb portions 46b, 48b, 52b, 54b, 58b, 60b in the second converter 34 includes an inductor 64 and eight modules 66, although in other embodiments the number of modules 66 at least may vary from eight.

Each module 66 is switchable to selectively provide a voltage source. In particular, each module 66 includes first and second sets 68, 70 of series-connected switching elements 72. The sets 68, 70 of series-connected switching elements 72 are connected in parallel with an energy storage device 74 in a full-bridge arrangement to define a 4-quadrant bipolar module 76 that is able to provide zero, positive or negative voltage and can conduct current in two directions.

Figure 3:
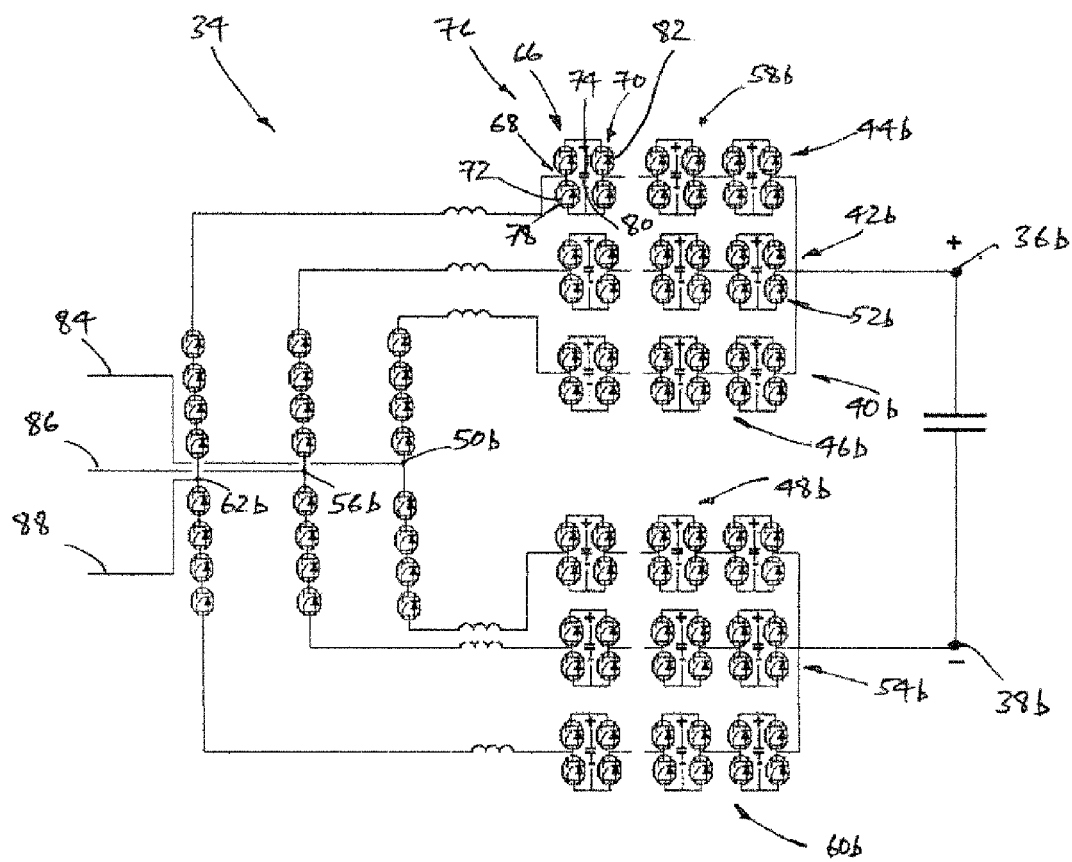
FIG. 3 shows a second modular multilevel converter which forms part of the converter assembly shown in FIG. 2.

FIG. 3, which shows a more detailed view of the second converter 34, illustrates a selection of the aforementioned 4-quadrant bipolar modules 76 within each limb portion 46b, 48b, 52b, 54b, 58b, 60b thereof.

In the embodiment shown each switching element 72 is a semiconductor device in the form of an Insulated Gate Bipolar Transistor (IGBT) 78, and each energy storage device 74 is a capacitor 80. Each switching element 72 includes an anti-parallel diode 82 that is connected in parallel therewith.

In other embodiments (not shown) each switching element 72 may be a different semiconductor device such as a gate turn-off thyristor, a field effect transistor (FET), an insulated gate commutated thyristor, or an integrated gate commutated thyristor. The energy storage device 74 may also differ from that in the embodiment shown, and may include any one or more of the following: a fuel cell; a photovoltaic cell, or a battery.

Figure 4:
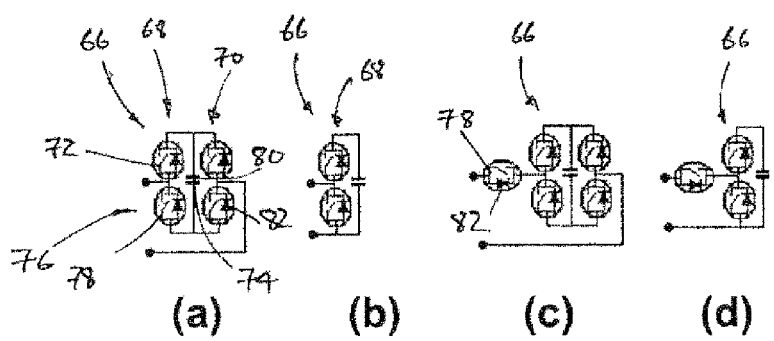
FIGS. 4(a) to 4(d) show respective modules which form part of each modular multilevel converter in the converter assembly shown in FIG. 2.

In still further embodiments of the invention one or more of the modules 66 may include only a first set 68 of series-connected switching elements 72, e.g. IGBTs 78, that are connected in parallel with an energy storage device 74 in a half-bridge arrangement, as shown in FIG. 4(b). In such a configuration the switching elements 72 and energy storage device 74 define a 2-quadrant unipolar module that can provide zero or positive voltage and can conduct current in two directions.

One or more of the modules may additionally include a further switching element 72 in addition to either of the full-bridge or half-bridge arrangements mentioned above, as illustrated in FIGS. 4(c) and 4(d).

The converter assembly 30 shown also includes first, second and third links 84, 86, 88 which electrically connect, respectively, the third terminals 50a, 50b, the fourth terminals 56a, 56b, and the fifth terminals 62a, 62b of the first and second converters 32, 34.

The first converter 32 additionally includes a controller (not shown) that is configured to:

(a) switch the first and second limb portions 46a, 48a of the first converter limb 40a of the first converter 32 into simultaneous conduction to divert a current portion $I_{DIV1}$ of the current $I_{CON1}$ flowing within the first converter 32 away from the first link 84, such that a current portion $I_{LINK1}$ flows through the first link 84 (where $I_{LINK1} < I_{CON1}$);

(b) switch the third and fourth limb portions 52a, 54a of the second converter limb 42a of the first converter 32 into simultaneous conduction to divert a current portion $I_{DIV2}$ of the current $I_{CON1}$ flowing within the first converter 32 away from the second link 86, such that a current portion $I_{LINK2}$ flows through the second link 86 (where $I_{LINK2} < I_{CON1}$); and (c) switch the fifth and sixth limb portions 58a, 60a of the third converter limb 44a of the first converter 32 into simultaneous conduction to divert a current portion $I_{DIV3}$ of the current $I_{CON1}$ flowing within the first converter 32 away from the third link 88, such that a current portion $I_{LINK3}$ flows through the first link 84 (where $I_{LINK3} < I_{CON1}$).

In use the converter assembly 30 functions as follows.

A first DC voltage $V_1$ is presented to the first and second terminals 36a, 38a of the first converter 32 by the first high voltage DC power transmission network 16.

Figure 5:
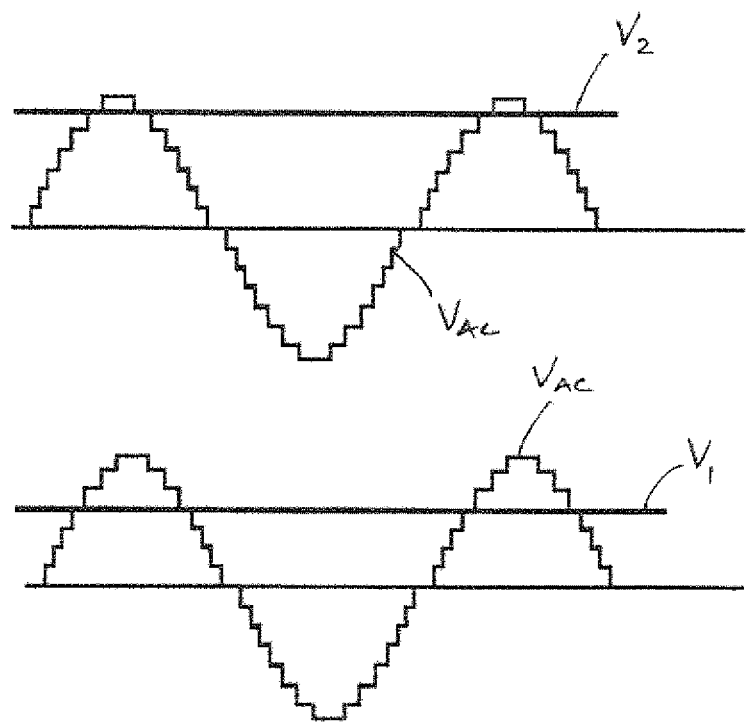
FIG. 5 illustrates the synthesis of a common alternating voltage within the converter assembly shown in FIG. 2.

The first modular multilevel converter 32 selectively switches the 4-quadrant bipolar modules 76 in the first converter limb 40a thereof to add voltage steps, i.e. "push up", the first DC voltage $V_1$ and synthesise a first alternating voltage phase component $V_{AC1}$ at the third terminal 50a of the first converter 32, as illustrated schematically in FIG. 5.

The synthesised voltage phase component $V_{AC1}$ has a substantially sinusoidal waveform, although in other embodiments the shape of the waveform may be different, e.g. tending towards a square waveform.

In this manner the first converter 32 varies the ratio of the magnitude of the first DC voltage $V_1$ and the magnitude of the first alternating voltage phase component $V_{AC1}$, i.e.

varies the magnitude ratio of the first DC voltage $V_1$ and the alternating voltage phase component $V_{AC1}$.

In the foregoing manner the first converter 32 synthesises a first phase of an alternating voltage $V_{AC}$ which is conducted by the first link 84 from the first converter 32 to the second converter 34.

In this regard it is noted that power is commonly transmitted in 3-phase networks by sinusoidal voltages and currents that are displaced by 120 electrical degrees. Each phase distributes power pulsating with a $2^{nd}$ harmonic component but when the three phases are combined, the sum is steady because the $2^{nd}$ harmonic components cancel.

In a similar manner to that mentioned above in relation to the first converter limb 40a, the first converter 32 switches the modules in the second and third converter limbs 42a, 44a to synthesise respective alternating voltage phase components $V_{AC2}$, $V_{AC3}$ at the fourth and fifth terminals 56a, 62a thereof.

The second and third links 86, 88 conduct the corresponding alternating voltage phase component $V_{AC2}$, $V_{AC3}$ to the second converter 34.

As such the magnitude of each alternating voltage phase component $V_{AC1}$, $V_{AC2}$, $V_{AC3}$ at each end of the corresponding first, second and third link 84, 86, 88 is the same, i.e. the magnitude remains constant.

It should be noted that in a different configuration the 4-quadrant bipolar modules 76 in each of the first, second and third converter limbs 40a, 42a, 44a can be used to subtract voltage steps, i.e. "pull down", the first DC voltage $V_1$ and synthesise respective phase components $V_{AC1}$, $V_{AC2}$, $V_{AC3}$ of an alternating voltage $V_{AC}$ at the third, fourth and fifth terminals 50a, 56a, 62a of the first converter 32 which have a lower magnitude than the first DC voltage $V_1$.

The second converter 34 selectively switches the 4-quadrant bipolar modules 76 in the first, second and third converter limbs 40b, 42b, 44b thereof to remove voltage steps from the corresponding alternating voltage phase components $V_{AC1}$, $V_{AC2}$, $V_{AC3}$ to synthesise a second DC voltage $V_2$ across the first and second terminals 36b, 38b of the second converter 34. Such a second DC voltage $V_2$ is thereby presented to the second high voltage DC power transmission network 18.

The modules 76 vary the ratio of the magnitude of the alternating voltage $V_{AC}$ (via manipulation of each of the phase components $V_{AC1}$, $V_{AC2}$, $V_{AC3}$ thereof) and the magnitude of the second DC voltage $V_2$.

Meanwhile the controller switches the respective limb portions 46a, 48a, 52a, 54a, 58a, 60a in each converter limb 40a, 42a, 44a of the first converter 32 into simultaneous conduction to divert a respective current portion $I_{DIV1}$, $I_{DIV2}$, $I_{DIV3}$, of a first DC current $I_{CON1}$ flowing around the first converter 32, away from the corresponding link 84, 86, 88, such that a reduced amount of current $I_{LINK1}$, $I_{LINK2}$, $I_{LINK3}$ flows through each link 84, 86, 88 to the second converter 34.

The reduced amount of current $I_{LINK1}$, $I_{LINK2}$, $I_{LINK3}$ entering the second converter 34 is synthesised by the second converter 34 into a second DC current $I_{CON2}$ which is lower than the first DC current $I_{CON1}$.

The difference between the first and second DC currents $I_{CON1}$, $I_{CON2}$ allows the converter assembly 30 to maintain a balance between the input power, i.e. $I_{CON1} \times V_1$, and the output power, i.e. $I_{CON2} \times V_2$, and so avoids the need for a high power transformer between the first and second converters 32, 34.

In use the converter assembly 30 is able also to respond to and isolate a fault that may occur in either of the first or second high voltage DC power transmission networks 16, 18.

Figure 6:
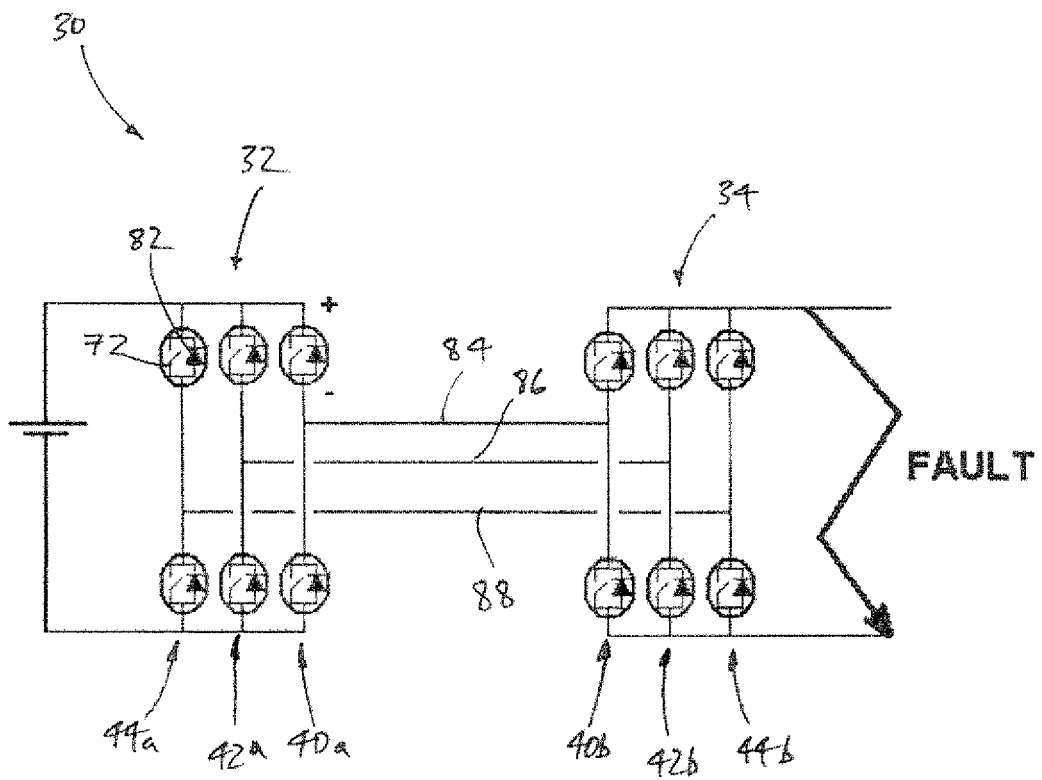
FIG. 6 illustrates the fault response of the converter assembly shown in FIG. 2.

For example, if a fault occurs in the second network 18, as illustrated schematically in FIG. 6, the voltage across each of the first, second and third links 84, 86, 88 between the first and second converters 32, 34 collapses to zero (i.e. there is a symmetrical 3-phase short circuit at the links 84, 86, 88 which is coupled through by the anti-parallel diodes 82 within the second converter 34).

With collapsed links 84, 86, 88 the anti-parallel diodes in the first converter 32 become reverse biased because the first DC voltage $V_1$ is higher than the (zero) alternating voltage $V_{AC}$ at the links 84, 86, 88.

As a result current cannot pass from the first network 16 to either the links 84, 86, 88 or the second network 18.

The converter assembly 30 therefore prevents the propagation of a fault from one DC network to another. The converter assembly 30 is able to provide such fault blocking even when the modules 66 in each of the first and second converters 32, 34 include half-bridge switching arrangements or series-connected IGBT valves.

Figure 7:
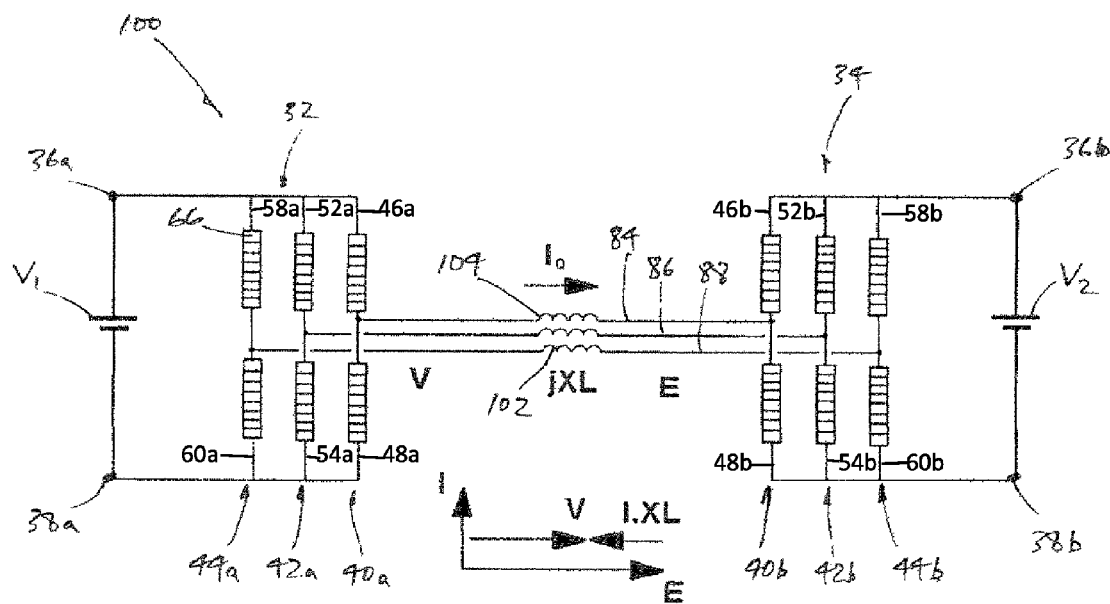
FIG. 7 shows a DC to DC converter assembly according to a second embodiment of the invention.

A converter assembly 100 according to a second embodiment of the invention is shown in FIG. 7.

The second converter assembly 100 is similar to the first converter assembly 30 and like features are designated by the same reference numerals. In this regard please note that the inductors 64 shown in the first converter assembly 30 have been omitted from FIG. 7 for clarity.

The second converter assembly 100 differs from the first converter assembly 30 in that each link 84, 86, 88 includes an inductive element 102, e.g. an inductor 104, connected in series therein.

The second converter assembly 100 functions in essentially the same manner as the first converter assembly 30. However, the inclusion of an inductive element 102 in each link 84, 86, 88 of the second converter assembly 100 means that each converter 32, 34 is able additionally to generate and/or absorb reactive power.

As a result the first and/or second converters 32, 34 may operate to vary the magnitude of alternating voltage $V_{AC}$ at one end of each link 84, 86, 88 to the magnitude of alternating voltage $V_{AC}$ at the other end of the corresponding link 84, 86, 88. In such a manner the second converter assembly 100 is able to generate and accommodate different voltage magnitudes at either end of each link, and so is able to operate over a greater ratio of first and second DC voltages $V_1$, $V_2$ than the first converter assembly 32.

A converter assembly according to a third embodiment of the invention is designated generally by the reference numeral 110.

Figure 8:
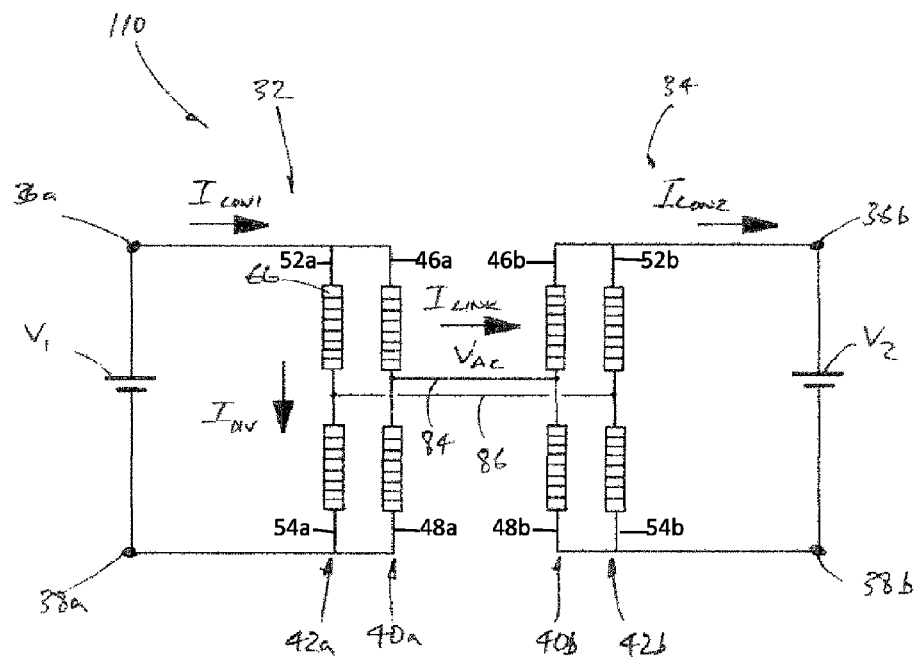
FIG. 8 shows a DC to DC converter assembly according to a third embodiment of the invention.

As illustrated in FIG. 8, the third converter assembly 110 is similar to the first converter assembly 30 and similar features share the same reference numerals. The third converter assembly 110 differs, however, from the first converter assembly 30 in that each of the first and second converters 32, 34 includes only two converter limbs, i.e. first and second converter limbs 40a, 40b, 42a, 42b. Inductors 64 are again omitted from the respective limb portions of each converter limb 40a, 40b, 42a, 42b in FIG. 8 for reasons of clarity.

The third converter assembly 110 functions in a similar manner to the first converter assembly 30 except that only two phase components of alternating voltage $V_{AC1}$, $V_{AC2}$ are transmitted via the first and second links 84, 86.

As such the third converter assembly 110 provides the desired connection and power transfer between first and second high voltage DC networks 16, 18 while reducing the component count compared to the first converter assembly 30.

Figure 9:
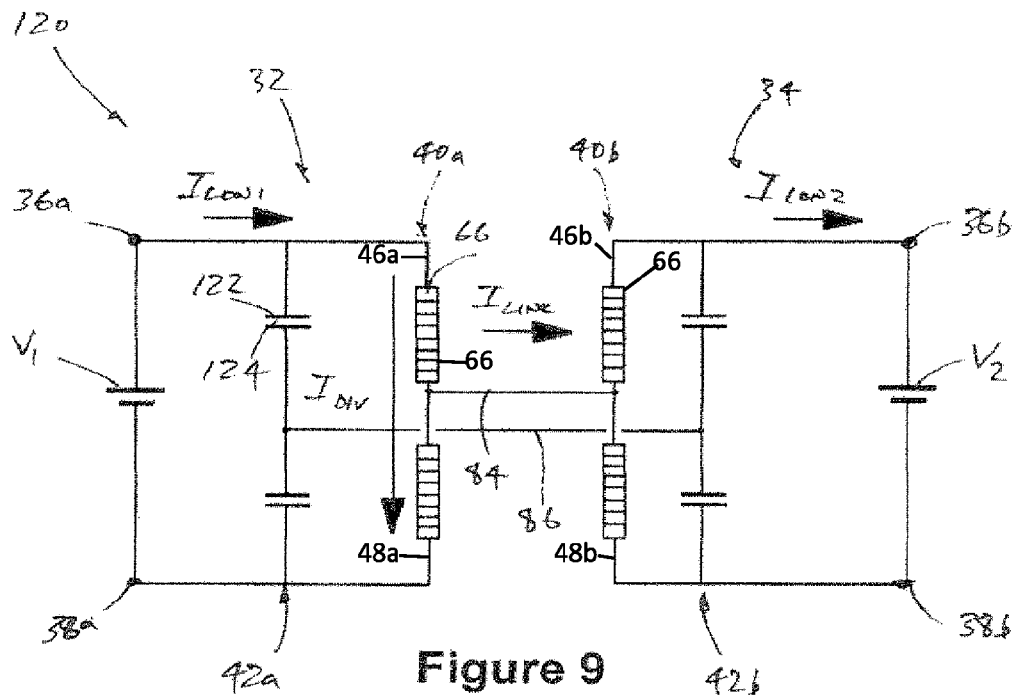
FIG. 9 shows a DC to DC converter assembly according to a fourth embodiment of the invention.

A still further converter assembly 120 according to a fourth embodiment of the invention is shown in FIG. 9.

The fourth converter assembly 120 is similar to the third converter assembly 110 and like features share the same reference numerals.

However, the fourth converter assembly 120 differs from the third converter assembly 110 in that each of the third and fourth limb portions 52a, 52b, 54a, 54b of each second converter limb 42a, 42b in each converter 32, 34 includes a passive voltage storage element 122 in the form of, e.g. a capacitor 124.

While such an arrangement reduces the ranges of available alternating voltage magnitude at the second link 86, it simplifies the structure of the fourth converter assembly 120 compared with that of the third converter assembly 110 by providing for only a fixed voltage and current transfer via the second link 86.

The fourth converter assembly 120 includes a controller which switches only the first and second limb portions 46a, 48a of the first converter 32 to vary the magnitude of a single, first alternating voltage phase component $V_{AC1}$ and the magnitude of the first current portion $I_{LINK1}$ which are transmitted by the first link 84 to the second converter 34. The controller varies the magnitude of the voltage phase component $V_{AC1}$ and the current portion $I_{LINK1}$ to additionally compensate for the discrepancy in power transferred by the second link 86.

Figure 10:
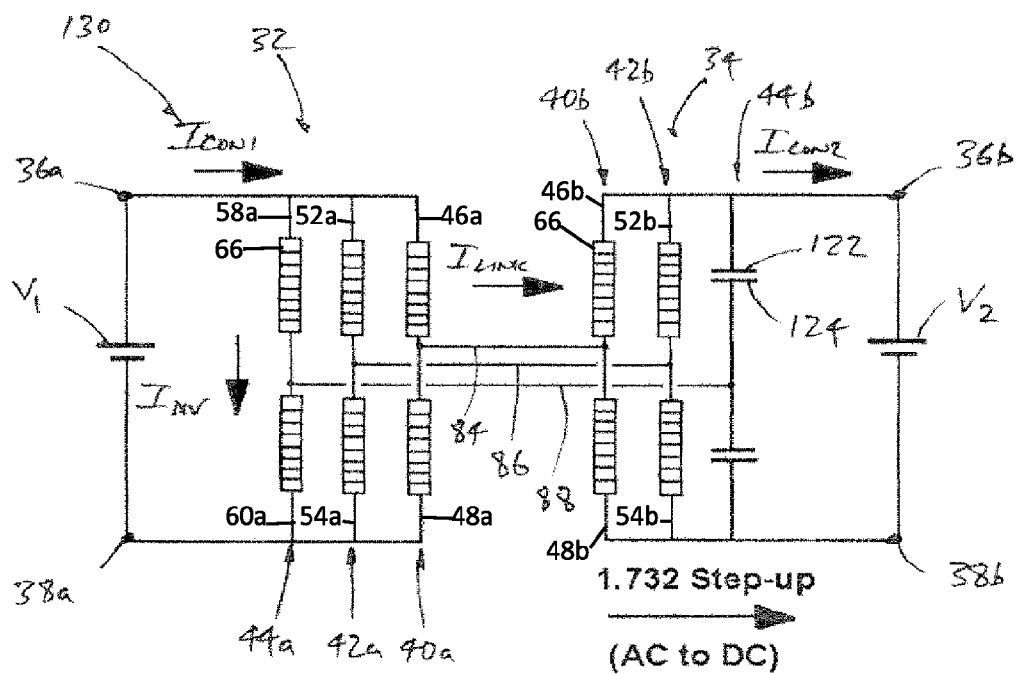
FIG. 10 shows a DC to DC converter assembly according to a fifth embodiment of the invention.

Another converter assembly 130 according to a fifth embodiment of the invention is illustrated schematically in FIG. 10.

The fifth converter assembly 130 is similar to the first converter assembly 30 and like features share the same reference numeral.

The fifth converter assembly 130 differs, however, in that the third converter limb 44b of the second converter 34 includes only a passive voltage storage element 122, e.g. a capacitor 124, in each of the fifth and sixth limb portions 58b, 60b thereof.

The controller in the fifth converter assembly 130 switches into simultaneous conduction the respective limb portions 46a, 48a, 52a, 54a, 58a, 60a in each of the converter limbs 40a, 42a in the first converter 32 to provide the desired balance in power transfer between it and the second converter 34.

The invention claimed is:

1. A DC to DC converter assembly for connecting first and second high voltage DC power transmission networks, comprising:
   first and second modular multilevel converters each modular multilevel converter including:
   first and second terminals connectable in use to a respective one of the first and second high voltage DC power transmission networks;
   a first converter limb extending between the first and second terminals of the modular multilevel converter and having first and second limb portions, the first and second limb portions in the first converter limb separated by a third terminal of the modular multilevel converter, each first and second limb portions in the first converter limb including at least one module switchable to selectively provide a voltage source and thereby vary the ratio of a magnitude of a DC voltage (V1, V2) across the first and second terminals of the modular multilevel converter and a magnitude of an AC voltage (VAC) synthesized at the third terminal of the modular multilevel converter, wherein the at least one module includes at least one set of series-connected switching elements connected in a parallel with at least one energy storage device;
   wherein the DC to DC converter assembly further includes a first direct link directly connecting the third terminal of one of the modular multilevel converter with the third terminal of the other modular multilevel converter; and
   at least one of the modular multilevel converters further including a controller configured to switch the first and second limb portions in the first converter limb of said at least one modular multilevel converter into simultaneous conduction to divert a portion (IDiV1) of current flowing within said at least one modular multilevel converter away from the first direct link.

2. The DC to DC converter assembly according to claim 1, wherein the first direct link includes a series inductance.

3. The DC to DC converter assembly according to claim 1, wherein the at least one module includes the set of series-connected switching elements connected in parallel with the respective energy storage device in a half-bridge arrangement to define a 2-quadrant unipolar module that can provide zero or positive voltage and can conduct current in two directions.

4. The DC to DC converter assembly according to claim 1, wherein the at least one module includes two sets of series-connected switching elements connected in parallel with the respective energy storage device in a full-bridge arrangement to define a 4-quadrant bipolar module that can provide zero, positive or negative voltage and can conduct current in two directions.

5. The DC to DC converter assembly according to claim 1, wherein the switching elements of the at least one module further include an anti-parallel diode connected in parallel therewith.

6. The DC to DC converter assembly according to claim 5, wherein the anti-parallel diode connected in parallel to the switching elements of the at least one module is configured to inhibit the flow of current through the modular multilevel converter in which it is located from the high voltage DC power transmission network which the modular multilevel converter is in use connected to the high voltage DC power transmission network in which a fault has occurred.

7. The DC to DC converter assembly according to claim 1, wherein each modular multilevel converter includes a second converter limb extending between the first and second terminals of the modular multilevel converter and having third and fourth limb portions separated by a fourth terminal, the fourth terminals of the modular multilevel converters being directly connected to one another by a second direct link.

8. The DC to DC converter assembly according to claim 7, wherein each of the third and fourth limb portions in the second converter limb in one of the modular multilevel converters includes a passive voltage storage element.

9. The DC to DC converter assembly according to claim 7, wherein each of the third and fourth limb portions in the second converter limb in at least one of the modular multilevel converters includes at least one module switchable to selectively provide a voltage source, and the controller is further configured to switch the third and fourth limb portions in the second converter limb of the at least one modular multilevel converter into simultaneous conduction to divert a portion of current flowing within the said modular multilevel converter away from the second direct link.

10. The DC to DC converter assembly according to claim 9, wherein the second direct link includes a series inductance.

11. The DC to DC converter assembly according to claim 7, wherein each modular multilevel converter includes a third converter limb extending between the first and second terminals of the modular multilevel converter and having fifth and sixth limb portions separated by a fifth terminal, the fifth terminals of the modular multilevel converters being directly connected to one another by a third direct link.

12. The DC to DC converter assembly according to claim 11, wherein each of the fifth and sixth limb portions in the second converter limb in one of the modular multilevel converters includes a passive voltage storage element.

13. The DC to DC converter assembly according to claim 11, wherein each of the fifth and sixth limb portions in the third converter limb in at least one of the modular multilevel converters includes at least one module switchable to selectively provide a voltage source, and the controller is further configured to switch the fifth and sixth limb portions in the third converter limb of the at least one modular multilevel converter into simultaneous conduction to divert a portion of current flowing within the said modular multilevel converter away from the third direct link.

14. The DC to DC converter assembly according to claim 13, wherein the third direct link includes a series inductance.

\* \* \* \* \*